US011763846B2

(12) United States Patent
Wu et al.

(10) Patent No.: US 11,763,846 B2
(45) Date of Patent: Sep. 19, 2023

(54) MAGNETIC DEVICES WITH OVERCOAT THAT INCLUDES A TITANIUM OXYNITRIDE LAYER

(71) Applicant: Seagate Technology LLC, Fremont, CA (US)

(72) Inventors: Zhuoyuan Wu, Eden Prairie, MN (US); Edwin F. Rejda, Bloomington, MN (US); Richard T. Greenlee, Lake Lillian, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/467,783

(22) Filed: Sep. 7, 2021

(65) Prior Publication Data
US 2021/0407541 A1 Dec. 30, 2021

Related U.S. Application Data

(62) Division of application No. 16/294,067, filed on Mar. 6, 2019, now Pat. No. 11,114,122.

(51) Int. Cl.
G11B 5/72 (2006.01)
G11B 5/31 (2006.01)
G11B 5/255 (2006.01)
G11B 5/00 (2006.01)

(52) U.S. Cl.
CPC ............... *G11B 5/72* (2013.01); *G11B 5/255* (2013.01); *G11B 5/314* (2013.01); *G11B 5/3106* (2013.01); *G11B 5/3163* (2013.01); G11B 2005/0021 (2013.01); Y10T 428/1164 (2015.01)

(58) Field of Classification Search
None
See application file for complete search history.

(56) References Cited

U.S. PATENT DOCUMENTS

| 5,777,792 | A | 7/1998 | Okada et al. | |
|---|---|---|---|---|
| 6,200,649 | B1 | 3/2001 | Dearnaley | |
| 8,014,104 | B2 * | 9/2011 | Cheng | G11B 5/8408 |
| | | | | 360/122 |
| 8,427,925 | B2 | 4/2013 | Zhao et al. | |
| 8,760,980 | B2 | 6/2014 | Zhang et al. | |
| 8,867,322 | B1 | 10/2014 | Chernyshov et al. | |
| 8,902,719 | B2 | 12/2014 | Zhao et al. | |
| 8,902,720 | B1 * | 12/2014 | Schreck | G11B 5/3106 |
| | | | | 369/13.13 |
| 9,036,307 | B1 * | 5/2015 | Hoshiya | G11B 5/3106 |
| | | | | 360/59 |
| 9,449,633 | B1 | 9/2016 | Pirzada et al. | |
| 9,530,445 | B1 | 12/2016 | Grobis et al. | |
| 9,558,777 | B2 | 1/2017 | Hellwig et al. | |
| 9,978,412 | B1 * | 5/2018 | Macken | G11B 5/314 |
| 2002/0197509 | A1 * | 12/2002 | Carcia | C23C 14/0652 |
| | | | | 428/689 |
| 2006/0024529 | A1 | 2/2006 | Murakami | |
| 2008/0187781 | A1 * | 8/2008 | Cheng | G11B 5/8408 |
| | | | | 428/812 |
| 2008/0231992 | A1 * | 9/2008 | Cheng | G11B 5/7264 |
| 2010/0307911 | A1 * | 12/2010 | Cheng | C23C 14/024 |
| | | | | 204/157.44 |
| 2011/0222190 | A1 | 9/2011 | Hara et al. | |
| 2013/0286799 | A1 | 10/2013 | Zhu et al. | |
| 2013/0314815 | A1 * | 11/2013 | Yuan | G11B 5/7369 |
| | | | | 360/59 |
| 2014/0177405 | A1 | 6/2014 | Rejda et al. | |
| 2014/0376350 | A1 | 12/2014 | Cheng et al. | |
| 2015/0037613 | A1 | 2/2015 | Gokemeijer et al. | |
| 2016/0133277 | A1 | 5/2016 | Cheng et al. | |
| 2016/0133288 | A1 | 5/2016 | Zhao et al. | |
| 2017/0125043 | A1 * | 5/2017 | Cheng | G11B 5/3106 |

FOREIGN PATENT DOCUMENTS

KR 2010-0101523 A 9/2010

OTHER PUBLICATIONS

Zengyuan Liu, et al. "Measuring Thermal Gradient in HAMR With Pseudorandom Bit Sequences," Digests of The 29th Magnetic Recording Conference (TMRC 2018) A5, pp. 23-24.
Frank Padera, Application Note, UV/Vis Spectroscopy, "Measuring Absorptance (k) and Refractive Index (n) of Thin Films with the PerkinElmer Lambda 950/1050 High Performance UV-Vis/NIR Spectrometers," PerkinElmer, Inc., (2013), pp. 1-9.
H.J. Richter et al., "Direct Measurement of the Thermal Gradient in Heat Assisted Magnetic Recording," IEEE Transactions on Magnetics, submitted for publication, Jan. 2013, pp. 1-4 (Article in IEEE Transactions on Magnetics • May 2013).

* cited by examiner

*Primary Examiner* — Kevin M Bernatz
(74) *Attorney, Agent, or Firm* — Kagan Binder, PLLC

(57) ABSTRACT

Described are magnetic recording heads that include an overcoat that includes a titanium oxynitride (TiON) layer.

20 Claims, 5 Drawing Sheets

US 11,763,846 B2

MAGNETIC DEVICES WITH OVERCOAT THAT INCLUDES A TITANIUM OXYNITRIDE LAYER

CLAIM OF PRIORITY

This application is a divisional of U.S. non-provisional application Ser. No. 16/294,067, filed Mar. 6, 2019, now U.S. Pat. No. 11,114,122, which is incorporated herein by reference in its entirety for all purposes.

FIELD

The invention relates to magnetic recording heads that include an air bearing surface and an overcoat on the air bearing surface that includes a layer of titanium oxynitride (TiON).

BACKGROUND

In the search for ever more storage density, hard disk drive manufacturers continue to advance beyond previous recording technologies by developing new technologies that are still better. The present invention relates to magnetic recording heads that operate with the technology referred to as heat assisted magnetic recording, or "HAMR."

Heat assisted magnetic recording is a magnetic recording technology that promises to drastically increase the areal density of data that can be recorded magnetically by a hard disk drive, by recording information using areal packets that are smaller than previously possible. Heat assisted magnetic recording techniques use radiation to heat a magnetic layer of a recording medium to a temperature above its curie temperature, which allows data to be written to the magnetic recording medium. To deliver energy from the radiation, in the form of heat, to a small area of the medium, a near field transducer ("NFT") is used. The near field transducer absorbs the radiation and transfers and focuses the energy to a very small area of the recording medium. In the process, the near field transducer may reach an operating a temperature that exceed 350 or 400 degrees Celsius. Structures of the magnetic recording head that surround and support the near field transducer can reach temperatures that may exceed 200 or 300 degrees Celsius.

The high operating temperatures of the near field transducer and surrounding structures can produce destructive results, such as oxidation or corrosion of a write pole, a near field transducer, or another surrounding or supporting structure. Other damage may be structural, for example the formation of structural voids, or the separation of surfaces of adjacent structures. Ultimately, any oxidation, corrosion, voids, separation, or other physical or chemical damage to structures of a magnetic recording head can reduce the performance quality of the magnetic recording head.

Because of harsh operating conditions (including high temperatures), and to protect some of the more delicate structures of a magnetic recording head from mechanical damage or wear (for example the near field transducer and the write pole), magnetic recording heads may include a hard, durable (e.g., wear resistant), heat-resistant overcoat (also referred to as a "topcoat," "head overcoat," or the like). The overcoat is designed to protect these structures from physical damage, i.e., mechanical damage. The overcoat can also protect the structures from exposure to chemical materials such as gaseous oxygen or moisture that can cause chemical degradation of a structure or material of the device. The overcoat may be a single material film or a multi-layer structure that is coated onto an air-bearing surface (ABS) of a recording head adjacent to and covering at least an area associated with the write pole and the near field transducer. Preferred overcoat materials are optically transmissive with a high refractive index. One example of a common protective overcoat is a layer of diamond-like carbon (DLC), but various other materials have also been considered for use in a head overcoat for a HAMR recording head.

SUMMARY

High operating temperatures make the materials and structures of a heat assisted magnetic recording head potentially susceptible to chemical and physical types of damage. Any vapor present in an atmosphere of use can cause damage to the device if allowed to contact materials at the device surface or to pass below the surface and into the materials or structure of the device.

To prevent vapor from contacting materials and structures of a heat assisted magnetic recording device, and to thereby prevent chemical or structural damage to the device that may be cause by the vapor, an overcoat layer that acts as a gas barrier may be placed over an otherwise exposed surface of the device, e.g., at an air bearing surface. Various overcoat materials and layers are generally known, as described for example in U.S. patent application numbers 2014/0177405, 2014/0376350, 2015/0037613, and 2017/0125043.

According to the invention, a magnetic recording medium includes an overcoat layer (a.k.a., as "head overcoat layer" or "HOC") is or includes a layer of titanium oxynitride (TiON). Titanium oxynitride is a useful material for the overcoat layer because of its optical properties and its high thermal stability. The head overcoat is placed at a location of a magnetic recording head and a near field transducer of the head.

In one aspect, the invention relates to a magnetic recording head that include an air-bearing surface, a magnetic write pole and a near field transducer associated with the air bearing surface, and an overcoat covering a portion of the air bearing surface at an area of the near field transducer. The overcoat comprising a titanium oxynitride layer.

In another aspect, the invention relates to a method of forming a heat assisted magnetic recording head. The method includes: providing a heat assisted magnetic recording head substrate comprising an air-bearing surface that includes a magnetic write pole and a near field transducer; placing an overcoat on the air bearing surface to cover a portion of the air bearing surface at an area of the near field transducer, the write pole, or both. The overcoat comprises a titanium oxynitride layer.

Figure 1:
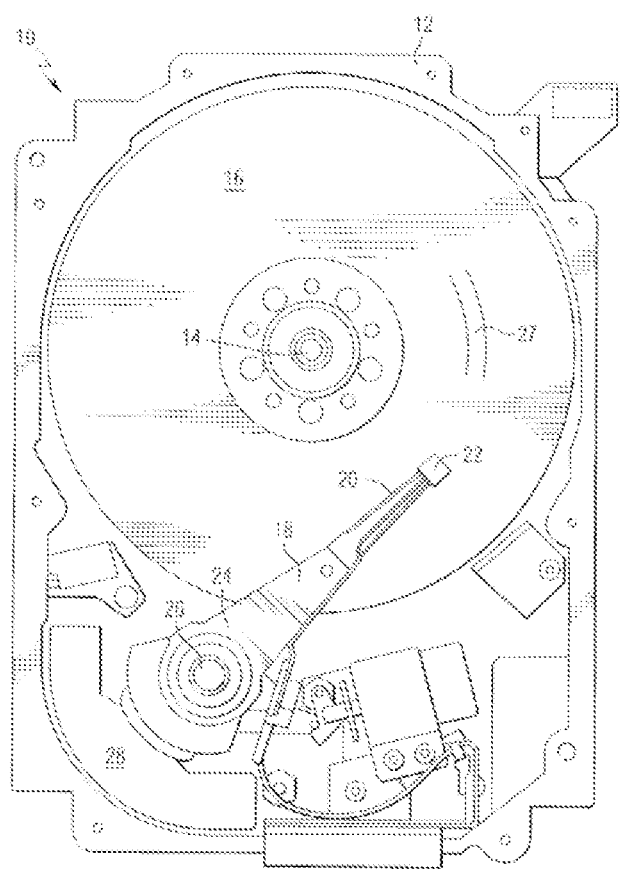
FIG. 1 shows a magnetic disk drive as described, that includes a magnetic recording head.

All figures are schematic and are not to scale.

DETAILED DESCRIPTION

The following description relates to magnetic recording heads that contain an air-bearing surface and an overcoat that covers at least a portion of the total area of the air bearing surface and that contains titanium oxynitride. The magnetic recording head may be any type of magnetic recording head, with an example being of the type referred to as a heat assisted magnetic recording head. Examples of this type of magnetic recording head may include a magnetic write pole, a waveguide, and a near field transducer.

The description also relates to methods of preparing these magnetic recording heads, and to larger electronic devices such as hard disk drives and components thereof, that contain a magnetic recording head as described.

Heat assisted magnetic recording (referred to through as HAMR) uses electromagnetic radiation to heat a recording medium to a temperature above its curie temperature, enabling magnetic recording at the heated location. In use, the radiation is delivered from a source, to a waveguide, and is directed to a small area (on the order of 20 to 50 nm for example) of the medium by using a near field transducer. During this process, the near field transducer absorbs energy from the laser and, from a nanoscale structure referred to as a "peg" or "antenna" of the near field transducer, focuses the energy to a very small area of the magnetic recording device. The temperature of the near field transducer, particularly at the peg, may reach an operating temperature of as high as 300, 350, or 400 degrees Celsius, or higher. Nearby structures such as a waveguide, write pole, and nearby insulating materials may reach operating temperatures that exceed 200, 250, 300, or 350 degrees Celsius.

The high operating temperatures reached by the near field transducer and surrounding structures, and the potential presence of vapors (e.g., oxygen or water vapor) in the operating atmosphere, can lead to oxidation, corrosion, or both of important structures of the magnetic recording device, such as the peg, the write pole, and surrounding materials. The high temperature can also cause materials adjacent to the peg to oxidize, which can lead to the peg becoming separated from a surrounding structure, including an overcoat layer disposed thereon. Ultimately, these destructive processes can lead to one or more of: peg deformation and recession, pole oxidation, pole protrusion, damage to the overcoat layer, or other forms of damage to the structures at or near the near field transducer. All of these effects can reduce the quality of a magnetic field delivered to a magnetic recording medium by the magnetic recording head, thereby affecting the quality of magnetic data written to the media.

According to the invention, a magnetic recording device includes an overcoat that contains a layer of titanium oxynitride. Titanium oxynitride (sometimes designated $Ti_xO_yN_z$ or TiON) is a known material that can be prepared in the form of a highly pure thin film by various deposition techniques such as sputtering and ion beam deposition. Titanium oxynitride thin films are deposited as materials that exhibit dielectric properties and can exhibit high optical transmissivity. Preferred titanium oxynitride thin films having useful or preferred gas barrier properties may preferably be amorphous as opposed to crystalline.

A preferred titanium oxynitride thin film will include amounts of titanium, oxygen, and nitrogen, and not more than minor or insubstantial amounts of other elemental components. The stoichiometry of the titanium oxynitride material can vary, and titanium oxynitride films may be considered to contain different stoichiometric variations, i.e., different relative amounts, of titanium, oxygen, and nitrogen. For example the ratio of oxygen to nitrogen may be selected to affect a physical or optical properties of a titanium oxynitride film.

Accordingly, a high purity deposited amorphous titanium oxynitride thin film material may sometimes be represented by the formula $Ti_xO_yN_z$. While the material may contain various different compounds formed of elemental titanium, oxygen, and nitrogen, including small amounts of titanium oxides (e.g., $TiO_2$) and titanium nitride (TiN), the overall material can be characterized by the formula $Ti_xO_yN_z$; non-limiting examples of useful or presently preferred ranges of x, y, and z may be: z in a range from 0.7 to 1.3, e.g., from 0.8 to 1.2; y in a range from 0.9 to 1.2, e.g., from 0.95 to 1.1; and z in a range from 0.9 to 1.2, e.g., from 0.95 to 1.1.

The titanium oxynitride layer may comprise, consist of, or consist essentially of titanium oxynitride, e.g., may contain at least 95 or 98 atomic percent of titanium oxynitride as described herein. A layer that consists essentially of titanium oxynitride contains at least 99, 99.9, or 99.95 atomic percent titanium oxynitride, e.g., is made of least 99, 99.9, or 99.95 atomic percent of a combination of titanium, oxygen, and nitrogen atoms.

The titanium oxynitride layer can be deposited by any useful method, at a useful thickness. A presently preferred method of applying a titanium oxynitride film to a magnetic recording device can be by ion beam deposition.

The titanium oxynitride layer can have a thickness that is useful to allow the layer to function as an overcoat (e.g., alone or in combination with other layers of a multi-layer overcoat) of a magnetic recording device. A useful thickness be selected to produce a balance between a need for a thicker overcoat layer to provide physical protection of the magnetic recording head, and a need for a thinner overcoat layer to prevent the layer from interfering with the function of the write head (write pole), near field transducer, or any other feature or structure of the magnetic recording head. A useful or preferred thickness can also depend or be selected based on factors that include the type of the magnetic recording head; operating temperature of the recording head; the specific materials of the different structures of the recording head; whether the layer is the only layer of an overcoat or is one layer of a multi-layer overcoat; and, if part of a multi-layer overcoat, the types (compositions) and thicknesses of the other layers.

Useful or presently preferred thicknesses of a titanium oxynitride layer, e.g., as alone as a single layer overcoat of a magnetic recording device, can be in a range from 1 to 10 nanometers, e.g., from 2 to 5 nanometers.

A useful or preferred titanium oxynitride layer has optical features that will allow the layer to be used as an overcoat of a magnetic recording device. For example, a titanium oxynitride layer can have both an optical transmittance and an index of refraction that allow the layer to function as an overcoat of a magnetic recording device. A titanium oxynitride film as described can have a high optical transmissivity at wavelengths in the visible spectrum, e.g., an absorbance constant (k) at 830 nanometers that is below 0.2 at 830 nanometers, e.g., below 0.1, 0.05, or 0.02. Generally, an index of refraction that is greater than 1.8 may be preferred for a barrier layer of a magnetic recording device. Titanium oxynitride has been measured to have an index of refraction above 1.9 or above 2.0, e.g., above 2.2 or 2.3. These optical properties are suited for use as an overcoat layer in a magnetic recording device that operates at a wavelength in the visible spectrum, such as a heat assisted magnetic recording device.

When used alone as an overcoat layer, or as part of a multi-layer overcoat of a magnetic recording device, a preferred titanium oxynitride layer can result in advantageous performance properties of a magnetic recording head, e.g., of a heat assisted magnetic recording head that is a component of a hard disk drive.

A titanium oxynitride layer can exhibit an improved thermal gradient relative to previous types of useful overcoat layers. The improved thermal gradient can result in increased recording density. In specific, with heat assisted magnetic recording techniques, the thermal gradient at the recording point determines the quality of the written transitions. Downtrack thermal gradient is a key metric used to characterize the performance of a heat assisted magnetic recording (HAMR) head, and can limit performance by determining the achievable transition width and hence linear density. See, "MEASURING THERMAL GRADIENT IN HAMR WITH PSEUDORANDOM BIT SEQUENCES," Ian GILBERT, Zengyuan LIU, Xuan ZHENG, Steven GRANZ1, Walter EPPLER, & Tim RAUSCH.

Preferred titanium oxynitride layers as part of a heat assisted magnetic recording head can exhibit an improved thermal gradient relative to a control overcoat, which can be a single or multi-layer overcoat of a type that is useful as an overcoat of a magnetic recording device and may be previously used or understood to be useful as part of a commercial magnetic recording head. An example of a control overcoat is a two-layer overcoat made of a layer of carbon-silicon nitride (CSiN) and an outer layer of diamond-like carbon (DLC). A comparison can be made between the control overcoat and an inventive overcoat, e.g., an overcoat that is or contains a titanium oxynitride layer as described herein. The inventive overcoat can have an improved thermal gradient relative to the control overcoat, e.g., a thermal gradient that is at least 5, 10, or 20 percent greater than a thermal gradient of the control overcoat. Alternately or additionally, a thermal gradient may be at least 0.02 degree (K) per nanometer (k/nm) higher than that of a control.

A heat assisted magnetic recording head that includes an inventive overcoat can also exhibit an improved areal density, relative to an identical heat assisted magnetic recording head that includes a control overcoat. The improvement may be at least 5 or 10 percent, when areal density is measured by identical test methods.

A heat assisted magnetic recording head that includes an inventive overcoat can also exhibit an improved "HOC lifetime," which is a measure of the durability of the overcoat ("head overcoat" or "HOC") as determined by testing the amount of time that a magnetic recording head (that includes the overcoat) can function, continuously, before experiencing a specified performance loss. A method of testing HOC lifetime can involve operating a hard disk drive recording system continuously, with a particular magnetic recording head and overcoat, with performing repeated writing and reading functions, for a time period that continues until a specified level of performance loss occurs. For example, a failing performance level may be a time when a magnetic recording head becomes unable to read or write from the magnetic recording medium of the hard disk drive being tested. With this measure of performance failure, preferred embodiments of inventive overcoats and magnetic recording heads as described can exhibit a HOC lifetime that is improved relative to a HOC lifetime of a control, with the improvement being at least 10, 20, 40 or even 70 percent relative to the HOC lifetime of the control.

The titanium oxynitride layer may by itself be an "overcoat" structure (i.e., an overcoat of a magnetic recording device may consist of the titanium oxynitride layer alone) or may be one of multiple different layers that together form a multi-layer overcoat structure. An overcoat may include the titanium oxynitride layer alone or with one or more additional layers such as a layer considered to be a wear-resistant layer, a layer that is considered to be a gas barrier layer, or both types of layers. The different layers of a multi-layer overcoat may be located at different areas over the air bearing surface (i.e., at different areas with respect to the length and width location of the air bearing surface), as well as at different vertical positions (different layers) in a multi-layer overcoat structure (i.e., at different height locations in a multi-layer overcoat structure). As part of a multi-layer overcoat, the titanium oxynitride layer may be directly adjacent to an air bearing surface, may be at an intermediate (middle) layer of a multi-layer overcoat, or may be at an outer layer of a multi-layer overcoat structure. The titanium oxynitride layer may be located on the air bearing surface to cover all of or only a portion of the surface, e.g., may be located to cover at least an area of a near field transducer, at least an area of a write pole, or both.

A magnetic recording head can be part of a magnetic recording device, e.g., a heat assisted magnetic recording device as shown at FIG. 1. FIG. 1 shows a data storage device in the form of disk drive 10 that can include a magnetic recording head that includes a titanium oxynitride layer as described. Disk drive 10 includes housing 12 (with the upper portion removed and the lower portion visible in this view) sized and configured to contain various components of the hard disk drive. These include a spindle motor 14 for rotating at least one magnetic storage media 16 within the housing. At least one arm 18 is contained within housing 12, with each arm 18 having a first end 20 with a recording head or slider 22, and a second end 24 pivotally mounted on a shaft by bearing 26. An actuator motor 28 is located at a second end 24 of the arm, for pivoting arm 18 to position recording head 22 over a desired sector or track 27 of disk 16. Actuator motor 28 is regulated by a controller, which is not shown in this view. The storage media may include, for example, continuous media or bit patterned media.

The interior of disk drive 10 contains a gaseous atmosphere that may be air but may preferable be a low density atmosphere such as an atmosphere of concentrated helium (e.g., an atmosphere of at least 80, 90, or 95 percent helium by volume). The atmosphere may alternately or additionally include a low amount of water vapor, a low amount of oxygen vapor or both, such as an amount of water vapor that is below 5, 1, 0.5, 0.1 percent by volume water vapor, an amount of oxygen that is below 5, 1, 0.5, 0.1 volume percent oxygen vapor, or an atmosphere that includes amounts of both water vapor and oxygen vapor that are at these low levels.

During a process of heat assisted magnetic recording (HAMR), electromagnetic radiation, which may be visible, infrared, or ultraviolet light, is directed to a surface of a data storage medium to increase the temperature of a localized area of the medium to facilitate switching of the magnetization of the area. Recent designs of HAMR recording heads include a thin film waveguide on a slider to guide light toward the storage media, and a near field transducer to focus the light to an area of a size that is smaller than the diffraction limit.

Figure 2A:
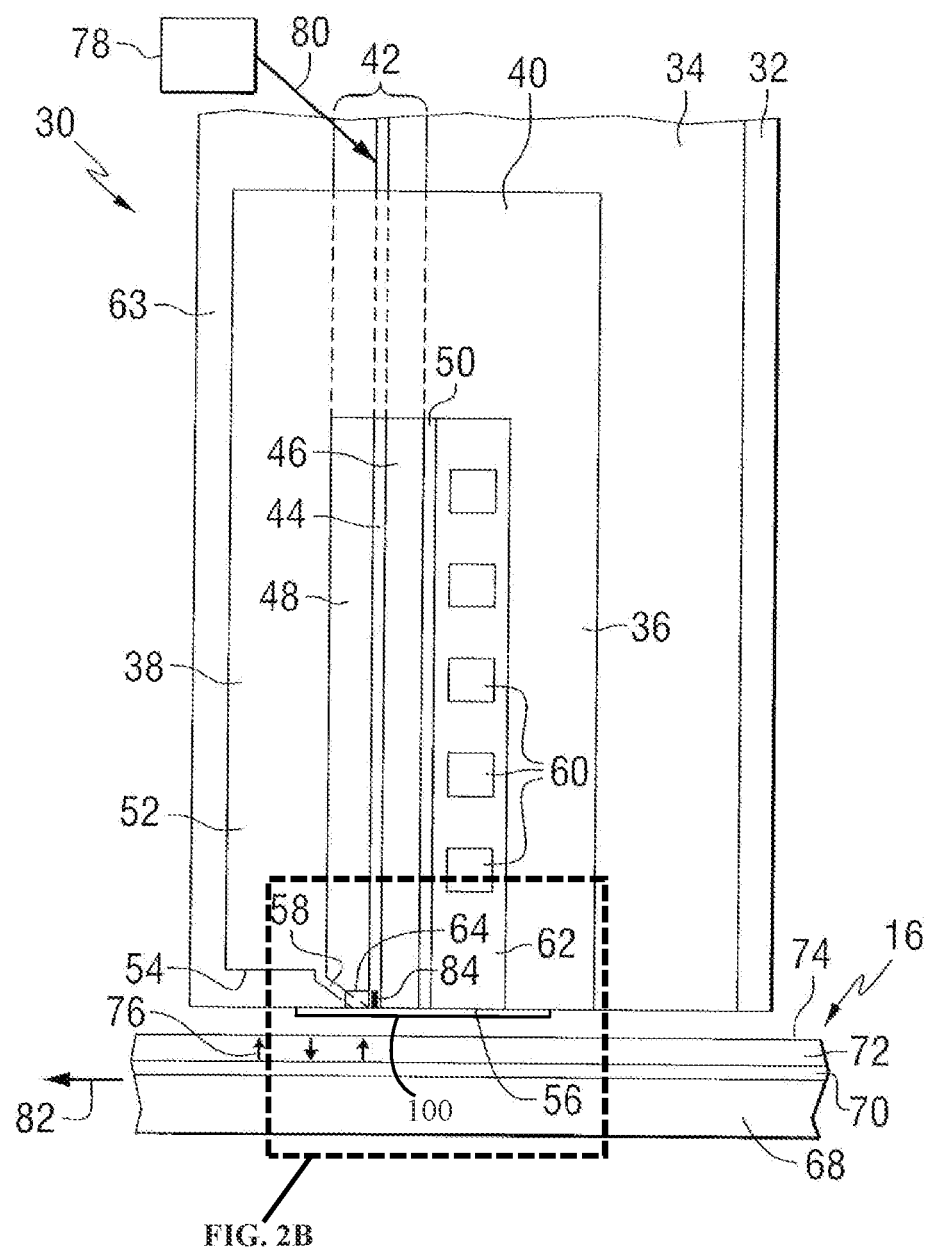
FIG. 2A is a cross sectional view of a heat assisted magnetic recording head and an associated recording medium.

Referring to FIG. 2A, shown is a side cut-away view of a heat assisted magnetic recording device ("heat assisted magnetic recording head") that includes a titanium oxynitride layer as described. The magnetic recording head is positioned near storage media 16. Magnetic recording head 30 includes substrate 32, base coat 34 on the substrate, bottom pole 36 on the base coat, and top pole 38 that is magnetically coupled to the bottom pole through a yoke or pedestal 40. Waveguide 42 is positioned between the top pole and the bottom pole. The waveguide includes core layer 44 and cladding layers 46 and 48 on opposite sides of core layer 44. Mirror 50 is positioned adjacent to one of the cladding layers. The top pole is a two-piece pole that includes a first portion, or pole body 52, having a first end 54 that is spaced from air bearing surface 56, and a second portion, or sloped pole piece 58, extending from the first portion in a direction of air bearing surface 56 and angled in a direction toward bottom pole 36. The sloped pole piece (and write pole) 58 is structured to include an end adjacent to air bearing surface 56, with the end being closer to the waveguide than the first portion of the top pole. Planar coil 60 also extends between the top pole and the bottom pole and around pedestal 40. In this example, the top pole serves as a write pole and the bottom pole serves as a return pole.

Insulating material 62 separates turns of coil 60. In one example, the substrate can be AlTiC, core layer 44 can be $Ta_2O_5$, and the cladding layers (and other insulating layers) can be $Al_2O_3$. A top layer of insulating material 63 can be formed on the top pole. Heat sink 64, which is optional and not required, is positioned adjacent to the sloped pole piece 58. The heat sink can be made of a non-magnetic material, for example gold.

Magnetic recording head 30 includes a structure for heating magnetic storage media 16 proximate to where write pole 58 applies a magnetic write field to storage media 16. In this example, media 16 includes substrate 68, a heat sink layer 70, a magnetic recording layer 72, and a protective layer 74. However, other types of media, such as bit patterned media can be used. A magnetic field produced by current in coil 60 is used to control the direction of magnetization of bits 76 in the recording layer of the media.

Storage media 16 is positioned adjacent to or under ("below" as illustrated at FIG. 2A) magnetic recording head 30. Waveguide 42 conducts light from a source of electromagnetic radiation (e.g., 78), which may be, for example, ultraviolet, infrared, or visible light. Source 78 may be, for example, a laser diode, or other suitable laser light source for directing a beam of electromagnetic energy (e.g., light) 80 toward waveguide 42. Specific exemplary types of light sources 78 can include, for example laser diodes, light emitting diodes (LEDs), edge emitting laser diodes (EELs), vertical cavity surface emitting lasers (VCSELs), and surface emitting diodes. In some embodiments, light source 78 can produce energy having a wavelength of 830 nanometers, for example, but other wavelengths may also be useful. Various techniques that are known for coupling light beam 80 to waveguide 42 may be used. Once light beam 80 is coupled into waveguide 42, the light propagates through waveguide 42 toward a truncated end of waveguide 42 that is formed adjacent air bearing surface (ABS) 56 of magnetic recording head 30. Light from waveguide 42 interacts with near field transducer 84, which delivers focused energy to a portion of media 16 as media 16 moves relative to recording head 30 as shown by arrow 82. Energy delivered by near field transducer 84 is the primary means of heating media 16.

Near-field transducer 84 is positioned in or adjacent to waveguide 42 and at or near air bearing surface 56. The design may incorporate optional heat sink 64 made of a thermally conductive material integral to or in direct contact with near field transducer 84 and chosen such that it does not prevent coupling of electromagnetic energy into and out of near field transducer 84. Optional heat sink 64 may be composed of a single structure or multiple connected structures, positioned such that the structure or structures can transfer heat to other metallic features in of magnetic recording head 30, or to gas flow external to recording head 30.

Figure 2B:
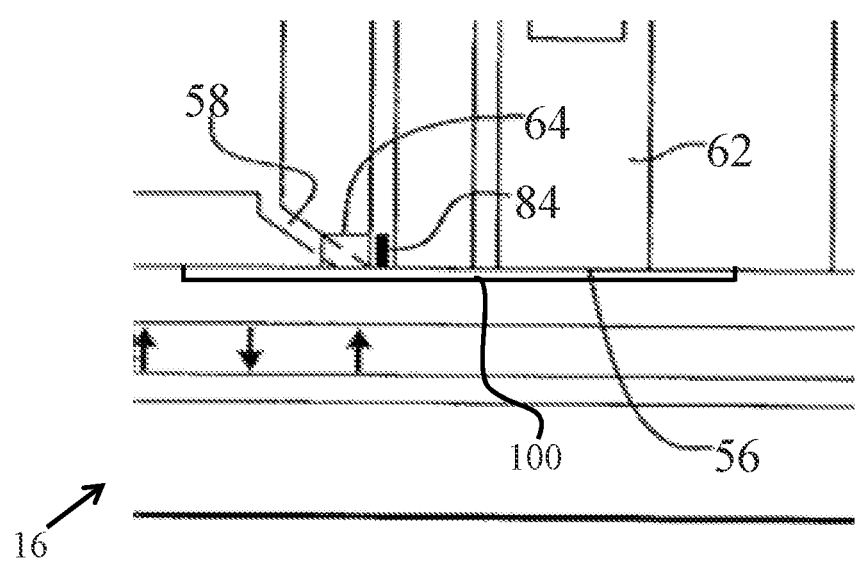
FIG. 2B is a detailed view of a portion of the magnetic recording head of FIG. 2A.

FIG. 2B is an enlarged view of the designed inset portion of FIG. 2A.

Although example magnetic recording head 30 of FIG. 2 shows a perpendicular magnetic recording head and a perpendicular magnetic storage media, it will be appreciated that the a titanium oxynitride layer of the present description may also be used with other types of recording heads and storage media as well. Also note, the titanium oxynitride layer may be used with magnetic recording devices other than HAMR devices.

Various materials are known for constructing each of the different structures of a magnetic recording device such as magnetic recording head 30. Examples of materials useful for preparing a near field transducer include gold (Au), silver (Ag), aluminum (Al), copper (Cu), ruthenium (Ru), rhodium (Rh), iridium (Ir), osmium (Os), palladium (Pd), alloys thereof, titanium nitride (TiN), zirconium nitride (ZrN), or combinations thereof; thermally conductive oxides; indium tin oxide (ITO); and combinations thereof. Certain of these materials may have relatively low resistance to oxidation (e.g., Rh, TiN, ZrN, etc.). When a material having low resistance to oxidation is used for a near field transducer, a titanium oxynitride layer as described, to protect the material during use, can be especially effective. A material of a near field transducer may comprise, consist of, or consist essentially of a material as listed or a combination of two or more of these, e.g., contains the specified material or combination and not more than an insubstantial amount of other ingredients, e.g., not more than 0.5, 0.1, 0.05, or 0.01 atomic percent of another material.

Examples of useful materials for a core of a waveguide include $Nb_2O_5$ and $Ta_2O_5$, $CeO_2$, $ZrO$, $HfO_2$, $Y_2O_3$, $Sc_2O_3$, and MgO, among other known materials. Examples of useful materials of a cladding portion ("clad") of a waveguide include $Al_2O_3$ and $SiO_2$, among other known materials. A core or a cladding may comprise, consist of, or consist essentially of these specified materials or a combination thereof.

Examples of details of near field transducers, waveguides, and other structures of magnetic recording devices useful according to the present description are described in U.S. Patent Publication Numbers 2013/0286799 and 2016/0133288, and U.S. Pat. No. 8,427,925.

A magnetic recording device as described can be incorporated into larger structure, such as a structure sometimes referred to as a "slider." Exemplary sliders can include a slider body that has a leading edge, a trailing edge, and an air bearing surface that includes the air bearing surface described herein as part of the magnetic recording head. The write pole, read pole, optical near field transducer and contact pad (and optional heat sink) can then be located on (or in) the slider body. Such exemplary sliders can be attached to a suspension which can be incorporated into a disk drive, e.g., as shown at FIG. 1.

Referring again to FIGS. 2A and 2B, overcoat layer 100 is located at air bearing surface 56 on the bottom of magnetic recording head 30. Overcoat layer 100 may be a single layer of titanium oxynitride, alone, on an air bearing surface of a magnetic recording device, in which case overcoat layer 100 is a titanium oxynitride layer that is in direct contact with the air bearing surface. In alternate embodiments, overcoat layer 100 can be a multi-layer overcoat structure that includes a titanium oxynitride layer along with other layers, and may be a layer that is nearest to the air bearing surface (in contact with the air bearing surface), or may be an outer layer, or may be an intermediate layer.

An overcoat or a titanium oxynitride layer can be coated over an entire area of an air bearing surface or may instead be coated selectively over one or more areas of an air bearing surface that require increased protection from vapor. Examples include areas that are particularly susceptible to chemical or structural damage if exposed to a vapor (e.g., water vapor, oxygen vapor, or another type of vapor), especially if that area is also one that operates at a high operating temperature such as a temperature of more than 200, 250, 300, 350, or 400 degrees Celsius. Portions of an air bearing surface that achieve a high operating temperature include an area of an exposed portion of a near field transducer (such as the "peg" of a near field transducer), an area of a write pole, an area of a waveguide near a near field transducer, as well as surfaces that include or are adjacent to a supporting structure such as a supporting dielectric material.

Figure 3:
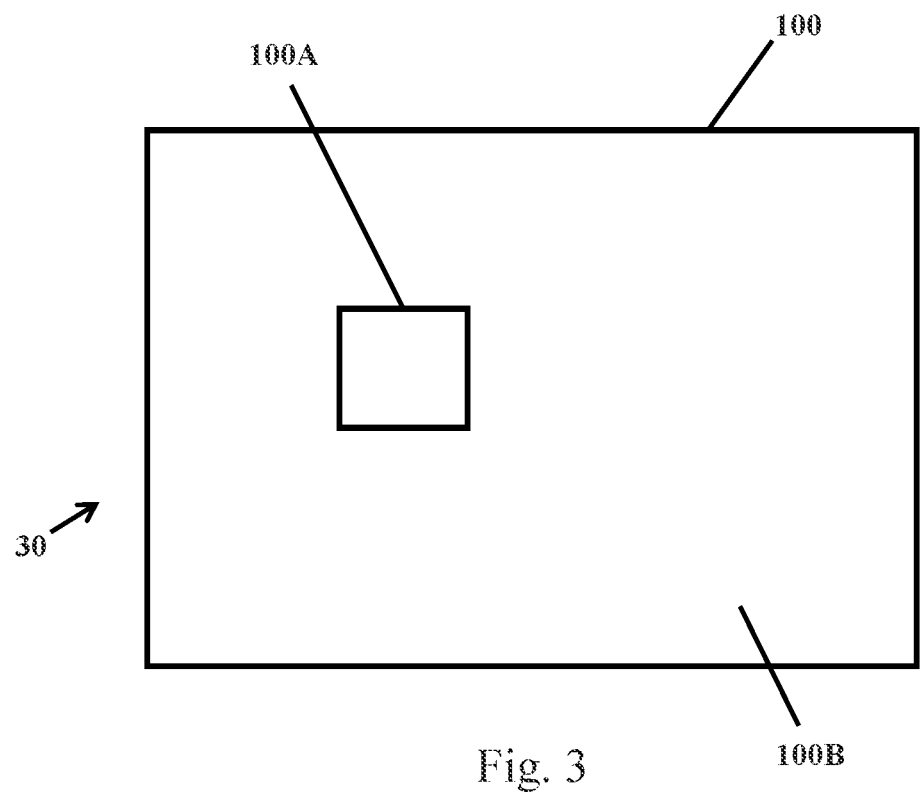
FIG. 3 is a schematic illustration of a portion of an air bearing surface that includes a titanium oxynitride layer as described.

FIG. 3 schematically shows a portion of an area of an air bearing surface of magnetic recording head 30, looking in an upward direction from the bottom of the magnetic recording head. Schematically, air bearing surface 56 is covered by overcoat 100, which includes area portion 100A and area portion 100B. Area portion 100A includes a titanium oxynitride layer as described. Overcoat 100 at area portion 100A may include only the titanium oxynitride layer or may be a multi-layer overcoat that includes the titanium oxynitride layer along with or more additional layers, as an overcoat stack. Area portion 100A may cover a structure or structures of magnetic recording device 30 that operate at a high operating temperature, such as any one or more of a near field transducer (or a "peg" thereof), a write pole, a waveguide, etc., and adjacent or supporting structures.

Area portion 100B may include portions of the air bearing surface that operate at an operating temperature that is below a temperature that may cause structural or chemical damage to a structure or material of magnetic recording device 30 at air bearing surface 56, e.g., below 200 or 250 degrees Celsius. Area 100B does not require and may specifically exclude a titanium oxynitride layer. Such embodiments, where an area of the titanium oxynitride layer is located over selected areas of an air bearing surface, can be fabricated by applying the titanium oxynitride layer as a pattern.

A titanium oxynitride layer may be placed alone, with no other materials, at a surface of an air bearing surface. In other examples embodiments, the titanium oxynitride layer can be part of a multi-layer overcoat structure. In either instance, the coating of the air bearing surface can be referred to as an "overcoat," either a single layer overcoat that consists of the titanium oxynitride layer, or a multi-layer overcoat that includes the titanium oxynitride layer in combination with one or more additional layers, such as a wear resistant layer, a dielectric layer, a magnetic layer, or a gas barrier layer.

A multi-layer overcoat (sometimes referred an overcoat "stack") can be considered to include ("comprise") or to consist of two or more different types of layers, each of which protects the materials and structures of the magnetic recording head that are at or near the air bearing surface. One of the layers may be referred to as a "contacting" layer, which is the layer that directly contacts the air bearing surface. Another layer is referred to as an "outer" layer, and is farthest spaced from the air bearing surface to be located at an outer-most layer of the multi-layer overcoat structure, to have an outer surface that is exposed. A third type of layer is an optional "intermediate" layer, which is disposed between the contacting layer and the outer layer. A multi-layer overcoat includes one contacting layer, one outer layer, and optionally may include one or two or more intermediate layers. According to example embodiments of the invention that include a multi-layer overcoat, the titanium oxynitride layer may be any one of these layers, e.g., a titanium oxynitride layer may be a contacting layer, a titanium oxynitride layer may be an outer layer, and a titanium oxynitride layer may be an intermediate layer.

Figure 4A:
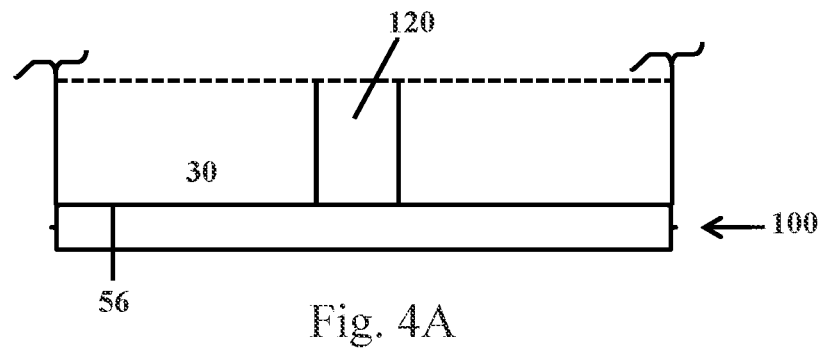
FIG. 4A shows an example of a magnetic recording device that includes a titanium oxynitride layer as described.
Figure 4B:
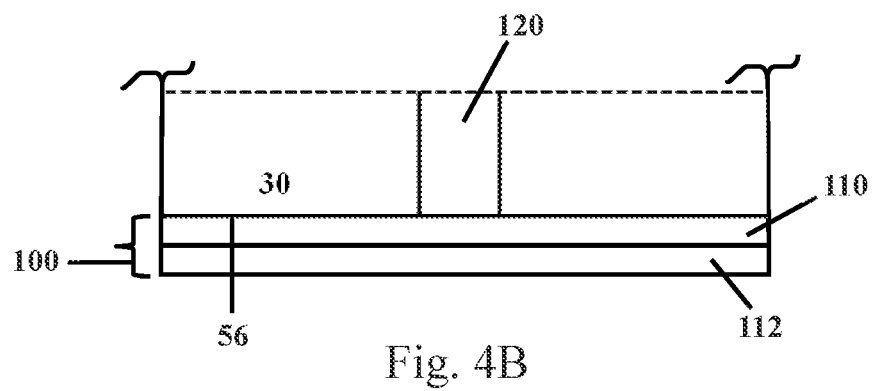
FIGS. 4B and 4C show examples of magnetic recording devices that include a titanium oxynitride layer as described and as part of a multi-layer overcoat.
Figure 4C:
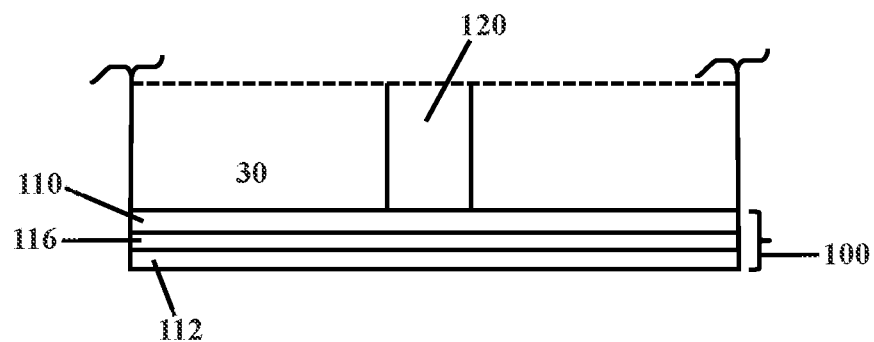

Referring to FIGS. 4A, 4B, and 4C, illustrated is an example of a portion of magnetic recording head 30 that includes air bearing surface 56 and region 120, which includes one or more of a near field transducer, a write pole, a read pole, a waveguide, or other supporting structure, any of which can be located either to have an exposed surface at air bearing surface 56, or to be beneath but near air bearing surface 56. Overcoat 100 is located to cover air bearing surface 56 at least at the illustrated portion of the air bearing surface of magnetic recording head 30.

As shown at FIG. 4A, example overcoat 100 can consist of a single layer 100 that is a titanium oxynitride layer as described.

As shown at FIG. 4B, example overcoat 100 consists of two layers, contacting layer 110 and outer layer 112. In one embodiment, contacting layer 110 can be a titanium oxynitride layer and outer layer 112 can be a different layer, such as a wear resistant layer or a different type of barrier layer. In a different embodiment, outer layer 112 can be a titanium oxynitride layer and contacting layer 110 can be a different layer, such as a wear resistant layer or a different type of barrier layer.

As shown at FIG. 4C, example overcoat 100 consists of three layers, contacting layer 110 outer layer 112, and intermediate layer 116. In one embodiment, contacting layer 110 can be a titanium oxide layer while outer layer 112 and intermediate layer 116 can each independently be a different type of layer, such as a wear resistant layer or a different type of barrier layer. In a different embodiment, intermediate layer 116 can be the titanium oxynitride layer while outer layer 112 and contacting layer 110 can each independently be a different type of layer, such as a wear resistant layer or a different type of barrier layer. In still a different embodiment, outer layer 112 can be the titanium oxynitride layer and intermediate outer layer 116 and contacting layer 110 can each independently be a different type of layer, such as a wear resistant layer or a different type of barrier layer.

The layers of an overcoat that are not the titanium oxynitride layer can each be made of a material and have a thickness that is effective for a desired function, such as to perform as a wear resistant layer or as a barrier, or in some cases to function as both. Each of these layers may have a different chemical composition, microstructure, crystalline or amorphous structure, mechanical properties (e.g., hardness, toughness, wear resistance), optical properties (e.g., refractive index and optical absorption), or any combination thereof.

A wear resistant layer is a layer of an overcoat that is designed in part or primarily to protect the air bearing surface from physical or mechanical damage. Examples of materials that may be useful as a wear resistant layer can include various types of carbon-containing materials, magnetic materials, and oxides such as tantalum oxide. The wear resistant layer may be crystalline or amorphous. Illustrative examples of carbon-containing materials include: diamond like carbon (DLC), amorphous carbon, carbon nitride, metal-containing amorphous carbon, tetrahedral amorphous carbon, hydrogen-containing amorphous carbon (a-C:H), and combination thereof. According to certain preferred embodiments of overcoat layers, an overcoat layer that includes or consists of a titanium oxynitride layer does not require a wear resistant layer such as diamond-like carbon, and may specifically exclude a wear resistant layer such as diamond-like carbon.

A multi-layer overcoat may alternately or additionally include any of various layers of material sometimes referred to as oxide layers, dielectric (insulating) layers, or barrier layers (e.g., gas barrier layers). Examples include dielectric layers or oxides such as those made of tantalum oxide (TaO), chromium oxide (CrO), silicon oxide (SiO), aluminum oxide (AlO), titanium oxide (TiO), zirconium oxide (ZrO), niobium oxide (NbO), hafnium oxide (HfO), aluminum silicon oxide (AlSiO), titanium silicon oxide (TiSiO), titanium aluminum oxide (TiAlO), tantalum aluminum oxide (TaAlO), tantalum silicon oxide (TaSiO), and titanium aluminum silicon oxide (TiAlSiO). These oxide materials can include any stoichiometry that includes the particular noted element or elements, with oxygen.

For the purpose of providing examples, a wear resistant layer, oxide layer, dielectric layer, an additional gas barrier layer, another layer of a multi-layer overcoat that is not a layer of a two-dimensional crystalline material may have a thickness of at least 0.2 nanometers (nm), e.g., at least 0.5 nm, and may have a thickness up to 5, 10, or 20 nanometers.

The invention claimed is:

1. A method of forming a heat assisted magnetic recording head, the method comprising:
   providing a heat assisted magnetic recording head substrate comprising an air-bearing surface that includes a magnetic write pole and a near field transducer,
   placing an overcoat on the air bearing surface to cover a portion of the air bearing surface at an area of the near field transducer, the write pole, or both, the overcoat comprising a titanium oxynitride layer having an optical absorbance constant (k) below 0.2 at 830 nanometers.

2. A method of claim 1 comprising placing the overcoat on the air bearing surface by ion beam deposition.

3. A method of claim 1 wherein the titanium oxynitride layer has an index of refraction of at least 1.9.

4. A method of claim 1 wherein the titanium oxynitride layer has an index of refraction of at least 2.2.

5. A method of claim 1 wherein the titanium oxynitride layer has an optical absorbance constant (k) below 0.1 at 830 nanometers.

6. A method of claim 1 wherein the titanium oxynitride layer has an optical absorbance constant (k) below 0.02 at 830 nanometers.

7. A method of claim 1 wherein the titanium oxynitride layer has
   an index of refraction of at least 1.9 and
   an optical absorbance constant (k) below 0.1 at 830 nanometers.

8. A method of claim 1 wherein the titanium oxynitride layer has
   an index of refraction of at least 2.2 and
   an optical absorbance constant (k) below 0.05 at 830 nanometers.

9. A method of claim 1 wherein the titanium oxynitride layer is represented as $Ti_xO_yN_z$
   wherein
   x is in a range from 0.7 to 1.3,
   y is in a range from 0.8 to 1.2, and
   z is in a range from 0.9 to 1.2.

10. A method of claim 1 wherein the titanium oxynitride layer is represented as $Ti_xO_yN_z$
    wherein:
    x is in a range from 0.8 to 1.2,
    y is in a range from 0.95 to 1.15, and
    z is in a range from 0.95 to 1.15.

11. A method of claim 1 wherein the overcoat comprises multiple layers that include the titanium oxynitride layer in combination with: an insulating layer, a diamond-like carbon layer, or both.

12. A method of claim 1 wherein the titanium oxynitride layer has a thickness in a range from 1 to 10 nanometers.

13. A method of claim 1 wherein the titanium oxynitride layer is placed at the area of the near field transducer, but is not placed over the entire area of the air bearing surface.

14. A method of claim 1 wherein the titanium oxynitride layer is located at the area of the magnetic write pole.

15. A method of forming a heat assisted magnetic recording head, the method comprising:
    providing a heat assisted magnetic recording head substrate comprising an air-bearing surface that includes a magnetic write pole and a near field transducer,
    placing an overcoat on the air bearing surface to cover a portion of the air bearing surface at an area of the near field transducer, the write pole, or both, the overcoat comprising a titanium oxynitride layer,
    wherein the titanium oxynitride layer is represented as $Ti_xO_yN_z$ wherein
    x is in a range from 0.7 to 1.3,
    y is in a range from 0.8 to 1.2, and
    z is in a range from 0.9 to 1.2,
    and wherein the titanium oxynitride layer has an index of refraction of at least 1.9 and an optical absorbance constant (k) below 0.2 at 830 nanometers.

16. A method of claim 15, wherein the titanium oxynitride layer has an optical absorbance constant (k) below 0.1 at 830 nanometers.

17. A method of claim 15, wherein the titanium oxynitride layer has an optical absorbance constant (k) below 0.05 at 830 nanometers.

18. A method of claim 15, wherein the titanium oxynitride layer has an optical absorbance constant (k) below 0.02 at 830 milometers.

19. A method of claim 15, wherein the titanium ox nitride layer has
    an index of refraction of at least 2.2 and
    an optical absorbance constant (k) below 0.1 at 830 nanometers.

20. A method of claim 15 wherein the titanium oxynitride layer has
    an index of refraction of at least 2.2 and an optical absorbance constant (k) below 0.05 at 830 nanometers.

\* \* \* \* \*